(12) United States Patent
Carroll et al.

(10) Patent No.: US 7,525,971 B2
(45) Date of Patent: Apr. 28, 2009

(54) SOFTWARE-HARDWARE PARTITIONING OF A SCHEDULED MEDIUM-ACCESS PROTOCOL

(75) Inventors: Martin D. Carroll, Watchung, NJ (US);
Ilija Hadzic, Millington, NJ (US);
Dusan Suvakovic, Marina Del Rey, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 577 days.

(21) Appl. No.: 11/081,932

(22) Filed: Mar. 16, 2005

(65) Prior Publication Data

US 2006/0209825 A1    Sep. 21, 2006

(51) Int. Cl.
*H04L 12/28* (2006.01)
*H04J 14/00* (2006.01)

(52) U.S. Cl. ...................... 370/395.4; 398/68
(58) Field of Classification Search .................. None
See application file for complete search history.

(56) References Cited

U.S. PATENT DOCUMENTS

| | | | |
|---|---|---|---|
| 6,546,014 B1 * | 4/2003 | Kramer et al. | 370/395.41 |
| 6,643,290 B1 * | 11/2003 | Glade | 370/395.4 |
| 2001/0008455 A1 * | 7/2001 | Saikusa | 359/168 |
| 2002/0122428 A1 * | 9/2002 | Fan et al. | 370/395.4 |
| 2004/0109688 A1 * | 6/2004 | Kim et al. | 398/68 |
| 2004/0141745 A1 * | 7/2004 | Han et al. | 398/58 |
| 2004/0258094 A1 * | 12/2004 | Bashan et al. | 370/486 |
| 2005/0047783 A1 * | 3/2005 | Sisto et al. | 398/71 |

OTHER PUBLICATIONS

R.M. Metcalfe et al., "Ethernet: Distributed Packet Switching for Local Computer Networks," Communications of the ACM, vol. 19, No. 7, pp. 395-404, Jul. 1976.

(Continued)

*Primary Examiner*—Clemence Han

(57) ABSTRACT

A processing device, configured to implement at least a portion of a scheduled medium-access protocol (SMAP) in a communication system, comprises a processor, a memory coupled to the processor, and one or more additional hardware modules. The functionality of the portion of the SMAP implemented in the processing device is partitioned between software, stored in the memory and executable by the processor, and hardware comprising the one or more additional hardware modules. In an illustrative embodiment, the processing device comprises a head-end device of a passive optical network, and the functionality comprises at least a scheduler and a grant generator, with the scheduler being implemented in the software and the grant generator being implemented in the hardware.

22 Claims, 5 Drawing Sheets

OTHER PUBLICATIONS

"Data-Over-Cable Service Interface Specifications," Radio Frequency Interface Specification, SP-RFI-I05-991105, Cable Television Laboratories, Inc. 3 pages, 1999.

G. Kramer et al., "Ethernet Passive Optical Network (EPON): Building a Next-Generation Optical Access Network," IEEE Communications Magazine, pp. 66-73, Feb. 2002.

Ilija Hadži ć et al., "Balancing Performance and Flexibility with Hardware Support for Network Architectures," ACM Transactions on Computer Systems, vol. 21, No. 4, pp. 375-411, Nov. 2003.

W-M. Yin et al., "Two-Phase Minislot Scheduling Algorithm for HFC QoS Services Provisioning," Proceedings of Global Telecommunications Conference (Globecom),IEEE, vol. 1, pp. 410-414, Nov. 2001.

N. Naaman, "Scheduling and Packing Problems in Centralized Access Networks," Department of Electrical Engineering, Technion, Ph.D. Thesis, Israel Institute of Technology, 2002.

D.L. Mills, "On the Accuracy and Stability of Clocks Synchronized by the Network Time Protocol in the Internet System," ACM SIGCOMM Computer Communication Review vol. 20, Issue 1, 11 pages, Jan. 1990.

* cited by examiner

SOFTWARE-HARDWARE PARTITIONING OF A SCHEDULED MEDIUM-ACCESS PROTOCOL

FIELD OF THE INVENTION

The present invention relates generally to communication systems, and more particularly to communication systems which utilize scheduled medium-access protocols (SMAPs).

BACKGROUND OF THE INVENTION

When two or more devices share a communication medium, a medium-access control (MAC) protocol is required to deal with the possibility of collisions. For example, the traditional Ethernet MAC uses carrier sense multiple access with collision detection (CSMA/CD), as described in R. M. Metcalfe et al., "Ethernet: Distributed Packet Switching for Local Computer Networks," Communications of the ACM, vol. 19, no. 7, pp. 395-404, July 1976. However, CSMA/CD is not universally applicable.

Consider by way of example the architecture of a broadband access network. Such a network typically comprises a single head-end device, located at the service-provider head-end facility, connected over a point-to-multipoint network to many devices located at or proximate the subscriber locations. More specific examples of such networks include DOCSIS-compliant cable-modem networks, described in "Data-over-cable service interface specifications radio frequency interface specification," Tech. Rep. SP-RFIv2.0-I01-011231," Cable Television Laboratories, Inc., December 2001, and various types of passive optical networks (PONs), such as Ethernet PONs (EPONs) as described in G. Kramer et al. "Ethernet Passive Optical Network (EPON): Building a Next-Generation Optical Access Network," IEEE Communications, pp. 66-73, February 2002. The head-end device connects the access network to some other external network, typically the Internet. The subscriber device connects the access network to the subscriber network, which may be as simple as a point-to-point Ethernet connection to a home personal computer (PC).

One can visualize an access network as a tree topology in which the head-end device broadcasts the downstream traffic to all subscriber devices, and each subscriber device "picks off" the traffic directed to it based on some protocol-specific addressing. In the upstream direction the medium is shared and hence requires a MAC protocol. If two subscriber devices transmitted at the same time, the signal would propagate upstream from two leaves of the tree and a collision would occur in either the access network or the head-end device.

In contrast to a traditional enterprise-scale Ethernet, an access network has endpoints that do not necessarily hear each other's transmissions, so CSMA/CD is not a viable option. Furthermore, the end-to-end propagation delays in an access network are too large for CSMA/CD to be practical. Instead, many access networks use a SMAP, in which the head-end device periodically informs the subscriber devices when it is their turn to transmit. If the schedule is correctly constructed, if no devices misbehave, and if time is properly synchronized among the head-end and subscriber devices, then collisions do not occur.

To construct the schedule, the head-end device runs a scheduling algorithm, which can be static (each subscriber device is given a fixed, regular fraction of the upstream medium, regardless of load), or dynamic (each device is given a timeslot allocation that is related to its current load and possibly some quality-of-service (QoS) parameters). SMAPs that support dynamic bandwidth allocation also provide a mechanism whereby each subscriber device can periodically report its load to the head-end device.

Activities such as scheduling, granting, time synchronization, and reporting are the basic components of a typical SMAP. The granting and reporting mechanisms are precisely defined by the protocol to ensure interoperability among the devices in the network. The scheduling algorithm, however, is typically left to the implementor, with the single requirement that the resulting grants do not cause collisions. Grants may also be required to meet any QoS requirements that the SMAP imposes.

The functions of any computer system (SMAP or otherwise) can be implemented in a number of different ways. For example, some functionality can be implemented in a general-purpose programming language such as C and run on a general-purpose processor; some functionality can be implemented in an assembly or C-like language and run on a network processor; some functionality can be implemented in a hardware-description language such as Verilog or VHDL and run in a programmable logic device; and some functionality can be implemented directly in an application-specific integrated circuit (ASIC).

Thus, it is possible to implement the basic components of a typical SMAP using a combination of software and hardware. Determining which portions of the SMAP are implemented in software and which are implemented in hardware is referred to herein as "software-hardware partitioning" of the SMAP. In this context, the term "software" is intended to refer to code executable on a general-purpose processor, while the term "hardware" refers to all other ways of implementing a system, including use of one or more network processors, programmable logic devices or ASICs.

The determination of the optimal software-hardware partitioning for a given SMAP is a difficult problem that has not been adequately addressed in conventional practice.

Accordingly, what is needed is a software-hardware partitioning technique that is applicable to a wide variety of SMAPs. The technique should be simple and efficient, and should allow all complex, application-dependent code to be implemented in software.

SUMMARY OF THE INVENTION

The present invention provides techniques for improved software-hardware partitioning of a SMAP.

In accordance with an aspect of the invention, a processing device, configured to implement at least a portion of a SMAP in a communication system, comprises a processor, a memory coupled to the processor, and one or more additional hardware modules. The functionality of the portion of the SMAP implemented in the processing device is partitioned between software, stored in the memory and executable by the processor, and hardware comprising the one or more additional hardware modules.

In an illustrative embodiment, the processing device comprises a head-end device of a passive optical network or other type of broadband access network, and the functionality comprises at least a scheduler and a grant generator, with the scheduler being implemented in the software and the grant generator being implemented in the hardware. Such an arrangement is an example of software-hardware partitioning in accordance with the invention. The scheduler is able to generate updated schedules at a rate which is independent of a rate at which the grant generator generates upstream channel access grants for subscriber devices of the system, thereby improving system performance.

The memory of the processing device may store at least one schedule data structure, the schedule data structure defining a schedule computed in the software by the scheduler. In the illustrative embodiment, a plurality of schedule data structures are stored in the memory, with the grant generator utilizing a first one of the schedule data structures to generate upstream channel access grants for subscriber devices of the system, and the scheduler using a second one of the schedule data structures to update the schedule. The scheduler, after updating the schedule using the second schedule data structure, is operative to direct the grant generator to switch from utilization of the first schedule data structure to utilization of the second schedule data structure in generating the upstream channel access grants.

In accordance with another aspect of the invention, the processing device comprises a subscriber device of a passive optical network or other type of broadband access network, and the functionality comprises at least a discovery module and a grant processor, with the discovery module being implemented in the software and the grant processor being implemented in the hardware.

Advantageously, the software-hardware partitioning techniques of the invention in the illustrative embodiment are not only simple and efficient, but are also applicable to any partitionable SMAP. For example, the techniques are particularly well-suited for use in EPONs, and other types of broadband access networks.

DETAILED DESCRIPTION OF THE INVENTION

The present invention will be illustrated herein in the context of a communication system in which a plurality of subscriber devices communicate over an access network with a head-end device. It should be understood, however, that the present invention, although particularly well-suited for use in this access network context, is not limited thereto. The techniques of the present invention are more generally suitable for use in any communication system application in which it is desirable to provide improved software-hardware partitioning of a SMAP in one or more processing devices of the system.

I. Example System

Figure 1A:
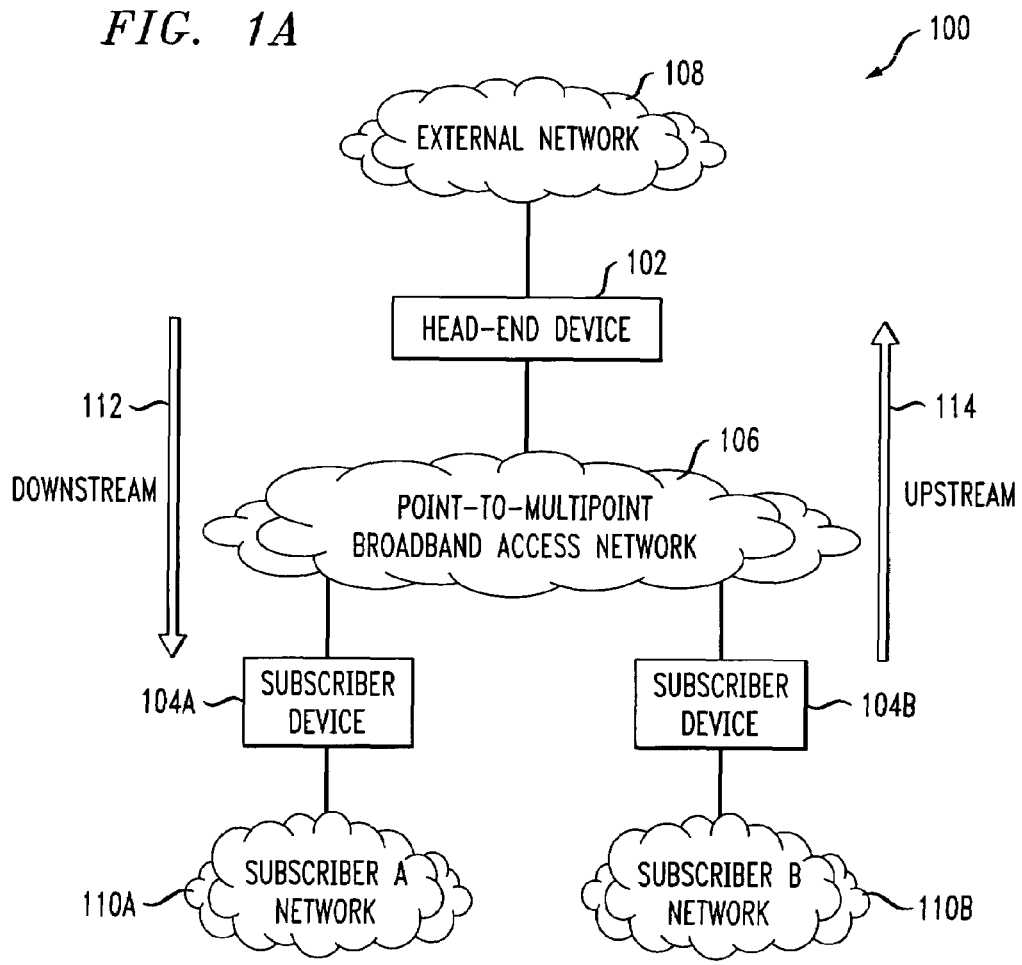
FIG. 1A is a block diagram of a communication system in which the present invention is implemented.

FIG. 1A shows an example of a communication system 100 in accordance with an illustrative embodiment of the invention. The system 100 includes a head-end device 102 which communicates with subscriber devices 104A, 104B over a point-to-multipoint broadband access network 106. The head-end device 102 is coupled to an external network 108. The subscriber devices 104A, 104B are coupled to respective subscriber networks 110A, 110B. The head-end device 102 communicates via network 106 with the subscriber devices 104A, 104B in a downstream direction 112 and in an upstream direction 114.

Conventional aspects of a system such as that shown in FIG. 1A are well known, and will not be described in further detail herein. The system 100 may represent, for example, an EPON, or other type of system which comprises a broadband access network.

Although for simplicity and clarity of illustration only two subscriber devices 104A, 104B are shown in the figure, a typical system will include more than two such devices. The devices 104A, 104B will be collectively referred to herein as devices 104.

Figure 2:
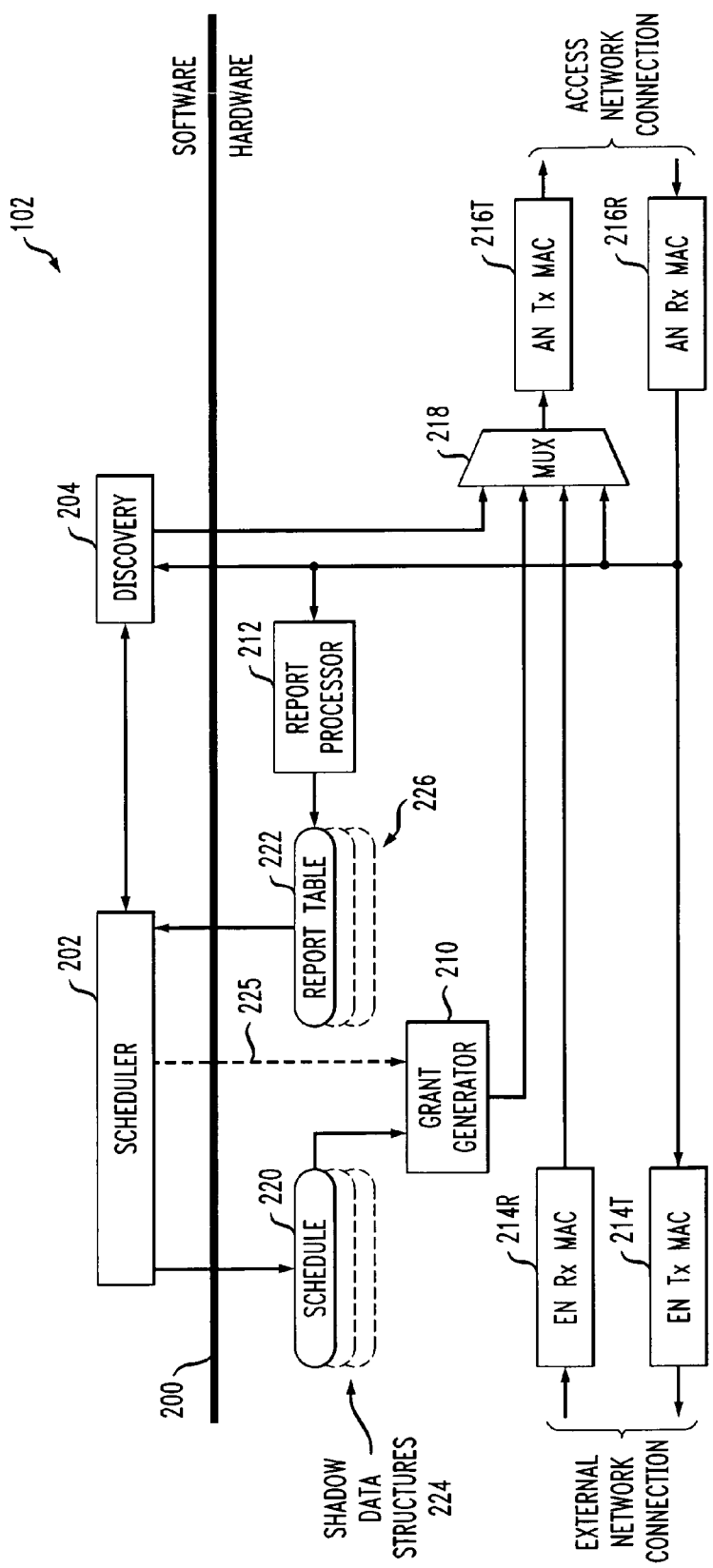
FIG. 2 illustrates SMAP software-hardware partitioning in a head-end device of the system of FIG. 1A, in an embodiment of the invention.
Figure 3:
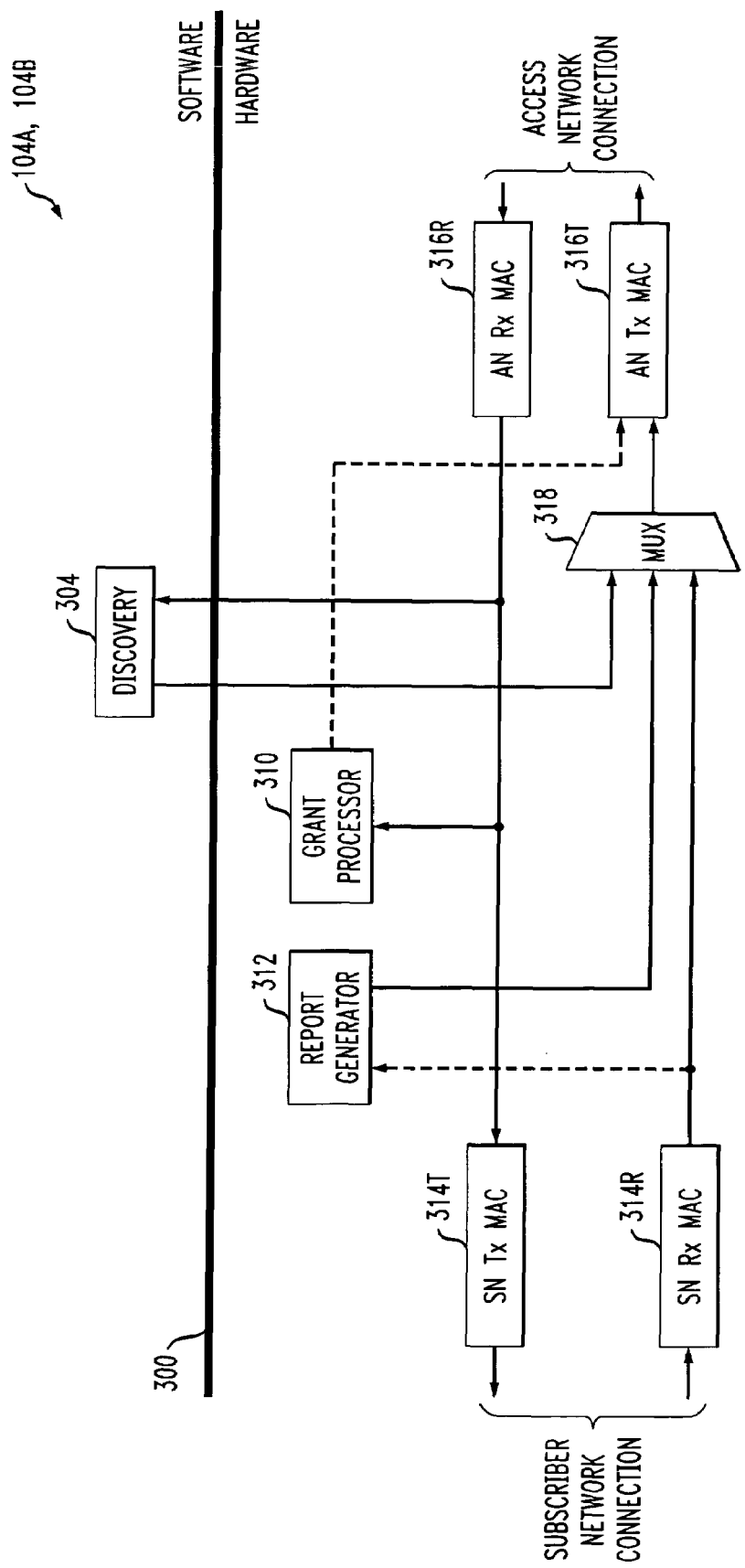
FIG. 3 illustrates SMAP software-hardware partitioning in a subscriber device of the system of FIG. 1A, in an embodiment of the invention.

In accordance with an aspect of the invention, system 100 comprises a SMAP implemented using particular software-hardware partitioning of the head-end device 102 and the subscriber devices 104. A more detailed view of the particular software-hardware partitioning of the head-end device 102 in the illustrative embodiment is shown in FIG. 2, while a more detailed view of the particular hardware-software partitioning of a given one of the subscriber devices 104 is shown in FIG. 3. It is to be appreciated, however, that these particular software-hardware partitioning arrangements of the illustrative embodiment are presented by way of example only, and should not be construed as limiting the scope of the invention in any way.

The SMAP as implemented in head-end device 102 and subscriber devices 104 may be an otherwise conventional SMAP modified in accordance with a software-hardware partitioning as described herein.

The head-end device 102 and subscriber devices 104 are examples of what are more generally referred to herein as "processing devices."

Figure 1B:
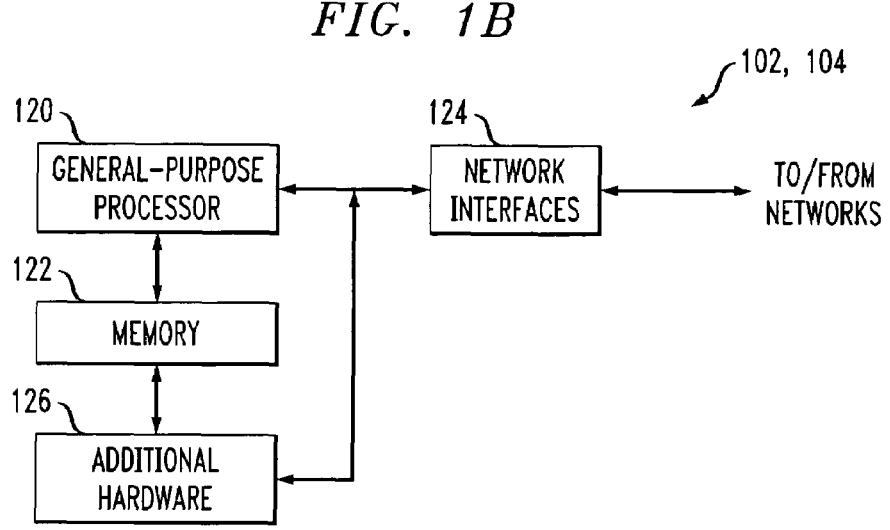
FIG. 1B is a block diagram of a processing device of the FIG. 1A system.

FIG. 1B is a simplified block diagram showing a processing device that may be viewed as representing one of the head-end device 102 or subscriber devices 104 in the FIG. 1A system. The processing device as shown comprises a general-purpose processor 120 coupled to a memory 122. The device communicates over its associated networks via respective network interfaces 124. Software for implementing software portions of the SMAP in the illustrative embodiment of the invention may be stored in memory 122 and executed by general-purpose processor 120.

Also included in the processing device of FIG. 1B is additional hardware 126, which may comprise, by way of example, one or more network processors, programmable logic devices, ASICs or other hardware modules, or portions thereof, in any combination. The additional hardware 126 is utilized in implementing hardware portions of the SMAP in the illustrative embodiment of the invention.

The software-hardware partitioning in the illustrative embodiment involves partitioning the functionality of an exemplary SMAP between software running on general-purpose processor 120 and hardware implemented in additional hardware element(s) 126. A different such partitioning is provided in the illustrative embodiment for the head-end device 102, as illustrated in FIG. 2, and for the subscriber devices 104, as illustrated in FIG. 3.

Although shown in FIG. 1B as being coupled to a common memory 122 and common set of network interfaces 124, the general-purpose processor 120 and additional hardware 126 may each include its own memory and interface elements, in addition to or in place of any common memory and interface elements.

The general-purpose processor 120 may represent a microprocessor, CPU or other general-purpose processing element, or portions or combinations of these or other known processing elements.

Similarly, memory 122 may be implemented in a conventional manner, and may represent electronic memory, magnetic memory or other storage devices, or portions or combinations thereof. The present invention is thus not restricted in terms of the particular configuration of the processing device or devices in which it is implemented.

Again, it is to be appreciated that the example arrangements shown in FIGS. 1A and 1B are considerably simplified for illustration purposes, and a given communication system or associated processor-based device configured in accordance with the invention may include different arrangements of elements or other elements not explicitly shown.

As indicated above, a SMAP advantageously avoids collisions by scheduling the uplink transmissions of the subscriber devices 104. Typically, the SMAP comprises a central entity, referred to herein as a scheduler, which in the illustrative embodiment is implemented in head-end device 102. The scheduler is responsible for determining the uplink transmission schedule and communicating that schedule to the subscriber devices 104.

The present invention provides techniques for optimal software-hardware partitioning of the SMAP in devices 102 and 104 of the system 100.

Generally, design partition between software and hardware in real-time systems is a trade-off between the three quantities: the performance enabled by hardware, the flexibility of software, and the total cost of the design. See, e.g., Ilija Hadzic et al., "Balancing Performance and Flexibility with Hardware Support for Network Architectures," ACM Transactions on Computer Systems, vol. 21, no. 4, pp. 375-411, November 2003. Software is relatively slow but flexible, whereas hardware is fast but more difficult to implement. Hardware is also more difficult (and in the case of ASICs, impossible) to modify in the field or at runtime. System cost, whether software or hardware, heavily depends on the design. A software-only implementation is often the cheapest solution. For many high-performance real-time systems, however, a combination of software and custom-designed hardware is the most cost-effective, because a software-only design would impose high (perhaps impossible) performance requirements on the system's general-purpose processor(s). Finally, for systems that need to execute simple but fast algorithms, a hardware-only implementation is usually the most cost-effective.

To partition a SMAP in the illustrative embodiment, we partition the scheduling, granting, time synchronization, and reporting functions.

If a SMAP scheduler is simple, it may be easy to implement in hardware (although software is always easier for anything other than the most basic functionality). In practice, however, the QoS requirements imposed by the SMAP or by the system vendor's value-added enhancements to the SMAP typically render the scheduler a complex piece of software. Designing a high-quality QoS-aware scheduler involves much experimentation and frequent changes to a potentially complex algorithm. Furthermore, the vendor is likely to require that the scheduler be a field-upgradeable component. Hence, it is preferable to implement most SMAP schedulers in software.

The SMAP granting procedure can be divided into two parts: grant generation, which happens in the head-end device, and grant processing, which happens in the subscriber device. The reporting procedure can similarly be divided into report generation (in the subscriber device) and report processing (in the head-end device). Because the scheduler is intimately involved in grant generation and report processing, implementing these activities in software as well may appear preferable. However, the high line rates of broadband networks force at least some parts of scheduling, grant generation, and report processing to be done in hardware. For example, the ITU-T standard G.984 for passive optical networks (also known as GPON) specifies that the head-end device must issue a complete set of grants for all subscriber devices once every 125 μs. See "Gigabit-capable Passive Optical Network (G-PON): Transmission convergence layer specification," ITU-T Recommendation G.984.3, February 2004. Within this time budget the head-end device must process all received reports, perform a potentially large volume of complex computations, construct all grant messages, and also be able to perform a large number of tasks not related to scheduling. In general, as the line rate, message frequency, and number of endpoints increase, software-only implementations may become impractical or infeasible.

Determining the optimal software-hardware partition for a given SMAP is a difficult problem that has not been addressed previously in the literature. Ideally, we would like to solve this problem just once and then be able to map many different SMAPs to the defined partition. However, as we shall see in Section VI, some SMAPs have certain design features that make hardware-software co-design difficult. Nonetheless, it may be possible to partition such protocols using techniques described herein.

The present invention in the illustrative embodiment provides a software-hardware partitioning technique that is applicable to a large class of SMAPs. The partitioning technique, which is referred to herein as Scheduling Protocol Lightweight Integration Testbed (SPLIT), is simple and efficient, applies to all partitionable SMAPs, and allows all complex, application-dependent code to be implemented in software. Although SPLIT is a general design, not a particular implementation, it is detailed enough to enable practitioners versed in the art to map it to any particular partitionable SMAP. As an aid to future protocol designers, we also explain how to recognize a SMAP that may be difficult to partition.

The remaining sections of this detailed description are organized as follows. Section II presents the SPLIT architecture. Section III addresses the issue of schedule quality. Section IV discusses the design of SPLIT scheduling in more detail. Section V shows an example of how to map SPLIT to a specific protocol. Section VI explains the features that may make certain SMAPs difficult to partition. Finally, Section VII discusses the performance of SPLIT. It should be emphasized that these sections describe an illustrative embodiment of the invention, and the disclosure therein should not be construed as limiting the scope of the invention. Numerous alternative embodiments will be apparent to those skilled in the art.

II. Split Architecture

FIG. 2 shows the software-hardware partition of the head-end device 102 in the SPLIT architecture of the illustrative embodiment. In the figure, everything above the thick horizontal line 200 is implemented in software running on the general-purpose processor, and everything below the line is implemented in hardware. Data structures are shown as ellipses. Generally, solid arrows represent the flow of packets, and dashed arrows represent the direction of internal control signals.

In the head-end device partitioning as shown in FIG. 2, scheduler 202 and discovery module 204 are implemented in software. Hardware is used to implement grant generator 210, report processor 212, external network transmit and receive MAC modules 214T and 214R, access network transmit and receive MAC modules 216T and 216R, and multiplexer 218.

The discovery module 204 enables the head-end device to discover when a new subscriber device joins or leaves the network. The discovery module must interact with the scheduler 202 to obtain the timeslots in which to exchange discovery messages. This internal interaction between the discovery module and the scheduler is not defined by any SMAP; further, it is likely to change as the scheduler itself changes. Because subscriber devices are discovered relatively infrequently, the discovery module in the head-end device can comfortably run on the same general-purpose processor as the scheduler.

The main data path through the system 100 is a bidirectional packet flow between the external network 108 and the access network 106. Data packets received from the external network (through the hardware module 214R labeled "EN Rx MAC") are relayed to the access network after being multiplexed with any control traffic produced by the grant generator 210 or discovery module 204 and possibly traffic that has been received from the access network and needs to be reflected back (e.g., to emulate local point-to-point connectivity among subscriber devices). The multiplexed packet flow is transmitted into the access network (by the hardware module 216T labeled "AN Tx MAC"). In the opposite direction, data packets received from the access network (through the hardware module 216R labeled "AN Rx MAC") are forwarded into the external network (by the hardware module 214T labeled "EN Tx MAC"). Control packets received from the access network are not forwarded into the external network, but are instead sent to either report processor 212 or discovery module 204.

The flow of control packets is originated and terminated in the head-end device 102 by generating grants and processing reports in hardware and computing the schedule in software. The data structure 220 that describes the schedule (labeled "schedule" in the figure) and the data structure 222 that describes the state of all subscriber devices known to the system (labeled "report table" in the figure) are both stored in memory, e.g., dual-port memory, and are accessible to the processor and additional hardware through a high-speed data path. From the software perspective, both tables are memory mapped regions that are accessed in the same manner and at the same speed as any other data structure in memory. From the perspective of the hardware, the report table is a write-only memory, and the schedule is a read-only memory whose content asynchronously changes during hardware operation.

The schedule data structure (which is described in more detail in Section IV) contains a list of grants for registered (i.e., previously discovered) stations. It is populated by the scheduler 202 and periodically read by the grant generator 210, which sends grant messages into the multiplexer 218. The scheduler updates the schedule whenever it deems necessary, independently of the operation of the grant generator. Because updating only one entry in the schedule can result in an invalid schedule (one with overlapping grants, for example), one or more shadow copies 224 of the schedule are used. The scheduler updates a shadow copy and, when it is done updating, signals the grant generator to switch to the specified copy (illustrated in the figure with the dashed arrow 225 between the scheduler and the grant generator). After the grant generator has finished processing the current table, the grant generator switches to the new table, and the previously active table becomes a shadow. The ideal number of shadow tables is a function of the SMAP and the scheduler, and can be determined in a straightforward manner by one skilled in the art.

The grant generator 210, as it runs in real time, parses the schedule data structure 220 at regular time intervals and generates grants periodically. In one particular example implementation of SPLIT, which was done for the EPON protocol, the grant generator ran at the modest clock rate of 62.5 MHz and was able to parse a fully populated (64-entry) table and generate the corresponding grant messages in less than 40 μs, shorter than the time it took to transmit these messages over the access network. Because the computational latency associated with the generation of a single grant message was less than the transmission time for the same message, it was possible to transmit grant messages in bursts, as they were generated, with minimum inter-packet gaps.

It should be noted that the scheduler is not required to run at this rate. Instead, the scheduler runs at its own pace, which is a function of the processor's speed and the scheduling algorithm's computational complexity. The algorithm designer can therefore trade off two important scheduling parameters: the scheduler quality, that is, how well the scheduler utilizes the upstream bandwidth while meeting all desired QoS parameters, and the scheduler occupancy, that is, the percentage of processor time that the scheduling algorithm needs to execute. A more complex scheduling algorithm can improve quality but degrade (that is, increase) occupancy. The design used in the illustrative embodiment makes the scheduler quality and occupancy independent of the grant-generation rate. We believe that this is the proper way to do the partitioning in the illustrative embodiment, because the grant-generation rate is usually dictated by the protocol, whereas the scheduler quality and processor requirements should be independent system-design parameters, determined by the price-performance tradeoff that a designer may wish to employ. The issues of quality and occupancy are discussed in greater detail in Section III below.

The scheduler 202 bases its decisions on input from the discovery module 204 and the report table 222. This table, which contains an up-to-date description of the subscriber's bandwidth needs, is maintained by the report processor 212. The report table, like the schedule data structure, decouples the system's message-processing function from the scheduling function. At any point in time, the report table represents the head-end's perception of the system state. The report table can also have shadow copies 226, which allow the processor to snapshot system states at multiple points in time and perform computations based on these samples.

If the software kept pace with the network, it would generate a new schedule on each report arrival and agility would be maximized. However, that design would not result in any processor offload and would therefore defeat the purpose of the software-hardware partition. The processor running at a lower rate introduces the effects of data sampling, because only one out of N samples of the system state is examined by the scheduler. As we shall see later, good SMAPs have low sensitivity to this sampling operation, and so the proposed architecture is viable.

FIG. 3 shows the software-hardware partition of one of the subscriber devices 104 in the SPLIT architecture of the illustrative embodiment. In the figure, everything above the thick horizontal line 300 is implemented in software running on the general-purpose processor, and everything below the line is implemented in hardware. Again, solid arrows represent the flow of packets, and dashed arrows represent the direction of internal control signals.

In the subscriber device partitioning as shown in FIG. 3, discovery module 304 is implemented in software. Hardware is used to implement grant processor 310, report generator 312, subscriber network transmit and receive MAC modules 314T and 314R, access network transmit and receive MAC modules 316T and 316R, and multiplexer 318.

Similarly to the head-end device 102, the subscriber device 104A or 104B forwards the data packets arriving from the access network 106 to the subscriber network 110A or 110B, while terminating the control-packet flow by forwarding control packets to the grant processor 310 and discovery module 304. In the opposite direction, the subscriber's data packets are multiplexed with the reports and control packets used in the discovery process and forwarded to the access network. The multiplexer 318 serves three queues, not explicitly shown, one holding the data packets, one holding the reports, and one holding the discovery packets. The latter two queues may be merged into a single queue depending on how the discovery module is implemented, which we discuss later in this section.

In the control plane, the report generator 312 monitors the level (and possibly other state information) of the queue that sits between the subscriber network receive MAC module 314R ("SN Rx MAC" in the figure) and the multiplexer 318. Based on the queue levels, the report generator constructs report packets and sends them to the multiplexer. In the opposite direction, the subscriber device processes the grants addressed to it and manages the timers that gate the access network transmit MAC module 316T ("AN Tx MAC" in the figure).

Although the software-hardware partition is not as critical in the subscriber device as in the head-end device, there are still certain benefits to implementing portions of the subscriber device in hardware. First, the subscriber device is at minimum required to synchronize its protocol clock time with the head-end device, and some protocols require frequency synchronization as well. Packet-based time synchronization is typically sensitive to arrival jitter, and in routerless networks (e.g., a passive optical network) the noise of the operating system running on the device is dominant. Furthermore, the precision with which the time must be synchronized is on the sub-microsecond order of magnitude. The timestamp in the packet should therefore be processed as "close to the wire" as possible. It is, therefore, preferable to implement the time-synchronization function in hardware.

Second, when the grant arrives at the subscriber device, the timer that will trigger the transmission at the beginning of the granted timeslot must be started. When the timer expires the grant processor 310 signals the access network transmit MAC module 316T to read the next packet from its queue, turn on a transmit optical source, and send the packet out (illustrated with the dashed arrow between the grant processor and the access network transmit MAC module). The latency between receiving the grant and starting the timer imposes a requirement on so-called "grant-ahead" time, which defines how much ahead of the actual timeslot the head-end device must issue the grant. Intuitively, shorter grant-ahead time is better. Because this latency is shorter when the general-purpose processor is not involved, there is a slight advantage to implementing the grant-processing function in hardware.

The final motive for implementing portions of subscriber device 104A or 104B in hardware involves report generation. Because the data path (i.e., the path that forwards packets between the subscriber network 110A or 110B and the access network 106) is usually a dedicated piece of hardware, the hardware-implemented report generator 312 has no more complexity than the hardware that would be needed to pass the state of the queues to software. Thus, we chose for the illustrative embodiment to implement the report generator in hardware as well.

As in the head-end device 102, the discovery module 304 of the subscriber device 104A or 104B is a software component. In general, if other software modules such as OA&M (operation administration and maintenance) exist, then it makes sense to implement discovery in software as well. If, however, there are no other subscriber device software components in the system, then adding a general-purpose processor for the sole purpose of implementing the discovery module might not be cost-justified.

The SPLIT architecture as described above advantageously decouples protocol-message generation and processing from the computations associated with the SMAP scheduler. This decoupling enables the two functions to execute asynchronously, each at its own rate. The first function typically must run at wire speed, so it is necessary to implement it in hardware, whereas the second function can run slower and is thus implemented in software on a general-purpose processor. If the partition is done correctly, the effect of the speed mismatch (between hardware and general-purpose processor) on overall system performance is minimal.

III. Quality

Figure 4:
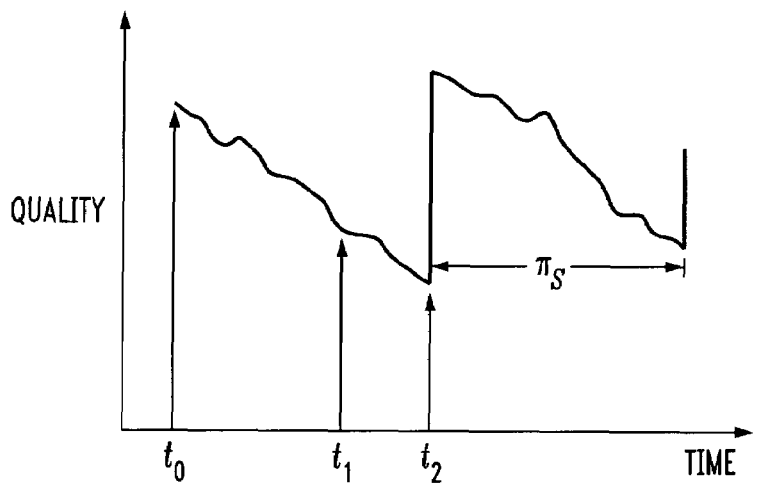
FIG. 4 shows an example of a graph of instantaneous schedule quality versus time in an embodiment of the invention.

Associated with a given SPLIT-based scheduler in the illustrative embodiment is a rescheduling period $\pi_S$. Every $\pi_S$ time units the scheduler consults the report table (and perhaps other information) and modifies its schedules accordingly. One may informally define the instantaneous quality of a schedule at time t to be any reasonable measure of how well that schedule meets the QoS requirements of the network at time t. FIG. 4 shows a graph of instantaneous schedule quality versus time. When the schedule constructs its first schedule at time $t_0$, that schedule has a certain quality. As time goes by and network conditions change, the quality of that schedule typically decreases. When, in the next rescheduling period, a new schedule is constructed, the new schedule will typically have higher instantaneous quality. This effect is repeated each rescheduling period. Hence, the figure is roughly a sawtooth. The more sophisticated the scheduling algorithm, the higher will be the instantaneous quality at the beginning of each sawtooth.

To be able to switch to a new schedule at the start of a rescheduling period (time $t_2$ in the figure), the scheduler must begin constructing that schedule sometime earlier (time $t_1$ in the figure). Typically, the more sophisticated the scheduling algorithm, the earlier must be $t_1$. If we make the simplifying assumption (solely for the sake of this analysis) that the scheduler requires approximately the same amount of lead time every rescheduling period, then the scheduler occupancy is $(t_1-t_1)/\pi_S$. Thus for a given scheduling algorithm, the shorter the rescheduling period, the higher the occupancy.

The scheduler implementor typically has two goals: maximize total quality, that is, the area underneath the quality curve, and keep the scheduler's occupancy within a system-imposed occupancy budget. The implementor meets these goals (if it is possible to meet them) by choosing the best scheduling algorithm. Here "best" does not necessarily mean "most sophisticated." To understand why, observe first that any scheduling algorithm can meet any imposed (nonzero) occupancy budget simply by making $\pi_S$ large enough. Consider the extreme case of a highly sophisticated algorithm that requires a rescheduling period of one century to meet the budget. Such an algorithm will almost certainly not maximize total quality. Indeed, a very "dumb" algorithm with a very short period would probably do much better. In general, which algorithm is best depends on factors such as the protocol, the processor, the occupancy budget, the QoS parameter set, and the typical network conditions, but typically not the grant-generation rate.

For a given scheduling algorithm, it is typically the case that the shorter the rescheduling period, the higher the overall quality (because the sawtooth does not have time to drop very far). Hence, after the scheduling algorithm is chosen, $\pi_S$ should be set (and possibly dynamically adjusted) to the minimum value for which the occupancy budget is met. A scheduler that has a small (e.g., under 10 ms) minimum achievable $\pi_S$ is agile, that is, can respond rapidly to changing network conditions. Although increasing scheduler agility is an important subgoal, the system designer should always remember that the ultimate goal is maximization of total quality within the occupancy budget. A major advantage of the SPLIT architecture of the illustrative embodiment is that it lets the system designer implement and use the scheduling algorithm that, for his network and system, best achieves this goal.

IV. Schedule Design

The design of the SPLIT schedule must be able to accommodate the varying QoS requirements of different SMAPs. For example, GPON specifies a single QoS requirement, namely, that the head-end device must issue a complete set of grants for all subscriber devices once every 125 μs. The EPON standard imposes no QoS requirements whatsoever. EPON does not even require any particular grant period; the head-end device can issue grants to whichever subscriber devices it likes, whenever it likes. The DOCSIS cable-modem standard, on the other hand, defines a large and hard-to-schedule set of QoS parameters.

To accommodate different QoS requirements, variants of the SPLIT schedule data structure of the illustrative embodiment may be used. For example, there may be basic schedule and enhanced schedule variants. The basic schedule may be used to support two of the basic QoS parameters imposed by many SMAPs (or service providers), namely, grant period and minimum guaranteed bandwidth (also known as "minrate"). If the SMAP and service provider require only those parameters (or a subset of those), then the SPLIT implementor can use a basic schedule. For those SMAPs and service providers that require additional QoS, an extended schedule can be used.

A. Basic Schedule

Associated with the grant generator 210 is a grant period $\pi_G$. Every $\pi_G$ time units the grant generator issues a set of grants. The best value (if not imposed by the protocol specification) depends on a number of factors, including the design of the SMAP, the desired values of the affected latencies, and the speed of the hardware. In many cases a value somewhere between 100 μs and 1 ms presents a good tradeoff. The SPLIT architecture of the illustrative embodiment permits $\pi_G$ to be dynamically changed in response to changing network and system conditions, if the network design warrants it and the standard does not preclude it.

The basic schedule is a simple linked list of grants. Every grant period the grant generator 210 processes the entire list and issues all the listed grants. The same set of grants is issued every grant period, until the scheduler 202 changes the schedule.

The basic schedule can be used to enforce the two basic QoS parameters. Grant period is intrinsic to the design, whereas minrate can be ensured for a given subscriber device by simply inserting enough grants, or sufficiently large grants, into the schedule. More generally, the basic schedule can be used to implement a weighted round-robin schedule, in which the total relative length(s) of the timeslot(s) assigned to a device corresponds to its weight. Other types of schedules may be used.

B. Extended Schedule

Some SMAPs and service providers have QoS requirements that cannot be enforced using a basic schedule. For example, if $\pi_G$ is 2 ms and a subscriber device requires a grant once every 3 ms, then it is not possible to construct the required grant list. As this example shows, QoS requirements on periodicity often render the basic schedule inadequate.

Notice that in the basic schedule the schedule size, that is, the amount of time in the upstream channel that the schedule maps, is equal to the grant period. To handle periodic QoS, an extended schedule lets the user choose different values for the schedule size and the grant period. For example, if we set the schedule size to 6 ms (and leave $\pi_G$ at 2 ms), then it is straightforward to construct a schedule in which the given subscriber device receives a grant once every 3 ms. In general, the best schedule size is usually the least-common multiple M of all periodic QoS constants that the scheduler is required to enforce, although other values can be used. The value of M is often much larger than the grant period.

Figure 5:
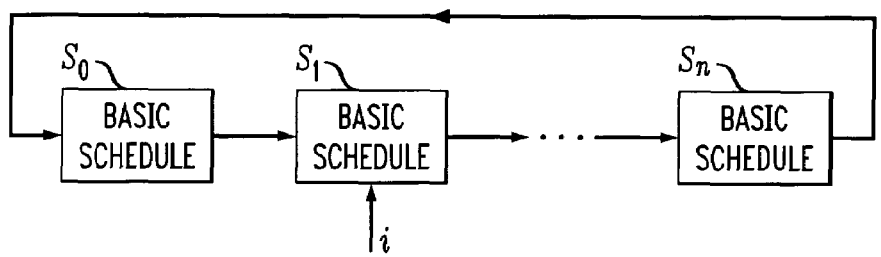
FIG. 5 shows how an extended schedule is formed from multiple basic schedules in an embodiment of the invention.

FIG. 5 shows an example of an extended schedule. It comprises a circular linked list of basic schedules, each of which maps the next $\pi_G$ time units in the upstream channel 114. There are n basic schedules, where the values of n, $\pi_G$, and M are chosen such that $(n)(\pi_G)=M$, although as indicated previously the invention does not require this particular formulation. The value of i is the index of the next basic schedule whose grants are to be generated. Every $\pi_G$ time units the grant generator 210 issues the grants for $S_i$ and then sets i to (i+1) mod n. Thus, the pointer is advanced to the next schedule and restarts from the first schedule in the list when the last element is reached. With the right choice of n, $\pi_G$, and M, any desired periodic QoS can be implemented.

Of course, numerous alternative ordered lists of schedules, and functions for traversing the lists, may be used, as will be readily appreciated by those skilled in the art. Generally, a given extended schedule may be viewed as an ordered set of basic schedules, and after a given one of the basic schedules is processed we advance to the next basic schedule in the ordered list. Typically, we do not revisit the same basic schedule until the entire ordered set has been exhausted.

Figure 6:
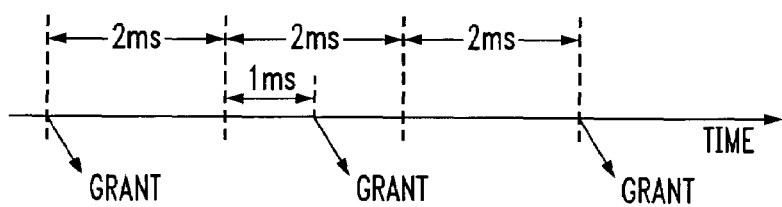
FIG. 6 shows an example of a grant transmission pattern in an embodiment of the invention.

Consider the previously mentioned example of a schedule with a 2 ms grant period and a subscriber device with service contract imposing a 3 ms periodicity requirement. In this case the extended schedule can be implemented as a three-element list (i.e., with three basic schedules). The first basic schedule contains a grant for the device starting at time zero relative to the beginning of the grant period associated with that basic schedule. The second basic schedule contains a grant for the same device, but starting at a time that is 1 ms after the beginning of the grant period associated with that basic schedule. The third element does not contain any grants for the given device. The resulting grant transmission pattern for this example is shown in FIG. 6.

Recall that in SPLIT there is one active schedule and one or more shadow schedules. With an extended schedule, schedule switching works as follows. If, when the schedule is switched, the grant generator 210 is currently processing a basic schedule, it finishes doing so, updates i, and then switches to the new (extended) schedule. Using only one global i variable for all schedules ensures that periodic QoS parameters will be met even when switching between schedules.

V. Protocol Mappings

The SPLIT architecture as described above is not protocol specific, but instead can be mapped to a variety of different SMAPs. Thus, to implement a given protocol using the SPLIT architecture, one must map SPLIT to the given protocol. As an example, we explain how SPLIT can be mapped to EPON, the Ethernet extension for passive optical networks, described in IEEE Standard 802.3ah-2004, "Media Access Control Parameters, Physical Layers, and Management Parameters for Subscriber Access Networks," June 2004, which is incorporated by reference herein. As already mentioned, EPON is a SMAP that contains no explicit QoS requirements. However, it is reasonable to expect that a practical implementation will support at least min-rate guarantees per subscriber device. As discussed in the previous section, such guarantees can be accomplished with a basic schedule.

In the example EPON implementation, we use one shadow copy of the schedule table and no shadow copies of the report table. Each entry in the schedule contains the following information: the start time and length of up to four grants; a flags bitmask; and a pointer to the next entry in the schedule.

There are up to four grants in each schedule entry because an EPON grant frame can contain up to four grants. The flags bitmask is set by the scheduler 202 and is used in the protocol to indicate (among other things) the actual number of grants in the frame. The location of the entry in memory implicitly specifies the subscriber device that is to receive these grants. Per the basic algorithm, the grant generator 210 processes the entire grant list every grant period and issues all the specified grants.

In EPON the head-end device 102 and all subscriber devices 104 each contain a 62.5 MHz protocol timer. The value specified in the grant message is the start time that the subscriber device timer will have at the beginning of the grant. It might seem straightforward, therefore, for the scheduler to specify absolute start times in the schedule. This scheme, however, does not work, because the second and successive times that the grant generator 210 walked the schedule, it would issue the same (now out-of-date) set of grants that it already issued. To overcome this problem, we set the start time in the schedule to the offset (in protocol ticks) from the beginning of the current grant period. When the grant generator constructs a grant, it adds to that offset the value that the subscriber device timer will have at the beginning of the current grant period.

Continuing to map the protocol to SPLIT, we set $\pi_G$ to 1 ms and we reschedule every 10 ms. The IEEE 802.3ah working group suggests 1 ms for $\pi_G$, although as already mentioned the standard has no notion of "grant period." Other values of $\pi_G$ may be used, as appropriate for a given application. The rescheduling period was chosen per the tradeoff between scheduler quality, scheduler agility, and processor speed. The example implementation uses a 300 MHz PowerPC processor and we have found that, for the scheduling algorithm, a rescheduling period of 10 ms provides high agility without overloading the processor.

Now consider the design of the report table 222. Each entry in that table corresponds to a single subscriber device and contains the value of the most recently received report from that device. When a report is received from the network, the originating device is identified based on a dynamically assigned value called logical link identifier (LLID). This 15-bit value carried in the packet preamble uniquely identifies the subscriber device. Because the maximum number of devices in the system (typically 64 or 128) is much smaller than the number of possible LLIDs (32768), we map the LLID to a local index that is used to address a row in the report table. The information carried in the report message is written into the row pointed to by the calculated index, any existing information being overwritten. Mapping of the LLID to the local index may be accomplished, by way of example, using a content addressable memory (CAM), as will be apparent to those skilled in the art.

Thus, when the scheduler 202 reads the table, it samples the most recent state of the system (in particular, the transmit queue levels of all known subscriber devices). Because the scheduler reads the table less often than it gets updated, some information may be lost. To preserve information about the system history, a more general SPLIT mapping may be used in which the value written to the table is calculated as a function of the current value and the last n reports. Such a design is analogous to the compensation filters often used in feedback-control systems. However, for most schedulers simply using the latest queue-level information is sufficient.

There are three properties worth noting that make EPON particularly easy to map to SPLIT. First, if the report table contains a legitimate state of the system, the update resulting from the arrival of a single report message also creates a legitimate state of the system. By "legitimate" we mean that the set of values do not logically conflict. This state may not be fully accurate (e.g., if a queue-level change has occurred but has not yet been recorded in the report table), but it is still usable in determining a fair schedule. This property allows the software scheduler to read the table at any time without having to synchronize with the hardware. The second property is that the latest received report is typically the most credible report for the given device, as it represents the latest "snapshot" of the queue level. Finally, the subscriber devices continually send report messages, so if a report is lost or not read by the scheduler, it will soon be updated by a new, even more credible one. The latter two are the key properties that make the system tolerant to report losses and data sampling, which in turn allow us to offload the processor by making the rescheduling period much larger than the grant period.

The EPON MAC is implemented in hardware to keep up with the line rate of 1 Gb/s. The MAC works with the described scheduling scheme as follows. The MAC's receive function matches the LLIDs of the incoming messages with the local index numbers, parses the incoming report messages, extracts the data relevant to the scheduler 202, and delivers that data to the report processor 212. The MAC's transmit function performs the reverse conversion of the index numbers to LLIDs, checks for available grant messages from the grant generator, and transmits those messages with the highest priority.

VI. SMAP Partitioning Issues

The SPLIT architecture of the illustrative embodiment may not be able to handle all SMAPs. Some SMAPs have certain design features that make it difficult to construct a software-hardware partition. An example of such a SMAP is DOCSIS, the de-facto standard for cable-modem networks. A DOCSIS scheduler is an extremely complex piece of software, and a given implementation may comprise over 30,000 lines of C code. Simpler implementations have been reported in the literature but in all such cases with which we are familiar, the authors either violated certain QoS requirements that render the implementation incorrect from the standard's perspective (See, e.g., W.-M. Yin et al., "Two-phase Minislot Scheduling Algorithm for HFC QoS Services Provisioning," in Proceedings of Global Telecommunications Conference (Globecom) 2001, IEEE, November 2001, vol. 1, pp. 410-414), or added major restrictions that render the scheduler unusable in any practical implementation (See, e.g., N. Naaman, "Scheduling and Packing Problems in Centralized Access Networks," Ph.D. thesis, Technion—Israel Institute of Technology, 2002). It should be noted, however, that the existence of a compliant software-only scheduler for DOCSIS does not in itself imply that a software-hardware partition is unnecessary. There are a number of places in the above-described illustrative scheduler where, if more CPU cycles were available, the scheduler could perform additional work that would have the effect of increasing the schedule's total quality (as described in Section III). If the required CPU cycles are not available, a software-hardware partition (SPLIT or otherwise) is called for.

Intuitively, a protocol that requires such a high complexity in a single software module is likely to have a serious flaw. We now analyze the properties that render DOCSIS difficult to partition in the SPLIT architecture of the illustrative embodiment. It is believed that, in general, any possible software-hardware partition of DOCSIS will result in little or no benefit to overall system performance, and hence the protocol may be viewed as "nonpartitionable" in general. Nonetheless, the techniques of the invention may be utilized to provide an appropriate software-hardware partition of DOCSIS or other similar SMAP that would not otherwise be readily partitionable using the particular SPLIT architecture of the illustrative embodiment.

In DOCSIS, each upstream channel logically contains one or more flows. When a subscriber device (i.e., a cable modem) needs to send one or more frames that are logically contained in a best-effort flow, the device first issues a request for the required bandwidth. The subscriber device then waits for the head-end device to grant the bandwidth. The head-end device must grant the requested bandwidth once (i.e., not repeatedly). Further, the head-end device must not grant less than the requested bandwidth, unless the containing flow is fragmentable. While waiting for the grant, the subscriber device must not issue another request for the same flow, even if more upstream-bound frames arrive in it. Finally, the totality of all grants issued must meet all minimum-bandwidth and maximum-bandwidth guarantees, preferably in a weighted fair manner.

First, notice that because the device does not issue another request for an already-requesting flow, the information in the report table becomes stale if it is not processed immediately after being received. If the scheduler decides to delay issuing a grant to a flow for a long time (because, for example, other flows are in more urgent need of servicing), then by the time the scheduler does issue a grant for that flow, its report-table entry will no longer accurately represent the current state of the subscriber device. This behavior can be visualized as a sampled data system whose controller freezes after a sample is latched and remains frozen until after that sample is processed, no matter how far in the future that may be. Such a system has no ability to offload itself by dropping n current samples and processing the next arriving sample, and hence is practically intolerant to sampling.

Second, notice that once it gets a request, the scheduler must issue the corresponding grant once. In SPLIT, the grant generator typically visits the table many times before the schedule is changed, and so it is hard to guarantee that a grant will be issued only once. To overcome this problem the hardware would have to support automatic removal of issued grants and the scheduler would have to feed new grants at line speed. In other words, the system does not tolerate extrapolated grants, i.e., grants generated without direct scheduler involvement. This requirement can easily degenerate the SPLIT schedule data structure into a simple transmit buffer, which would defeat any benefit of hardware acceleration.

The above two properties make it difficult to efficiently decouple SMAP message processing from the computation done by the scheduler. Any modification of SPLIT to accommodate the requirements of DOCSIS reduces or eliminates the performance benefit of a software-hardware partition. We can generalize the discussion by observing that, to be partitionable, a SMAP must be tolerant to both sampling and extrapolation.

As noted above, any SMAP not readily partitionable using the particular SPLIT architecture of the illustrative embodiment may nonetheless be partitionable using the techniques disclosed herein.

VII. Performance

To understand the speed-up offered by SPLIT, we compare it to a software-only implementation of a SMAP. To be fair, we assume a highly optimized implementation.

A highly optimized software-only SMAP implementation typically must perform, on the head-end device, the following work:

1. Every grant period, the software must construct and send grants to those subscriber devices that, according to the schedule, need them. Note that the number of subscriber devices that need grants, and the number of grants that each device needs, depends on the scheduling algorithm employed.

2. After each grant is constructed, it must be written into hardware memory for transmission. As an optimization we assume that all the grants for a single grant period are copied to hardware memory using a single scatter-gather DMA transfer. When the transfer is complete an interrupt is raised and software processes the interrupt.

3. Every rescheduling period, the software must examine all the latest reports and construct a new schedule based on the information therein. Notice that the latest reports for a given rescheduling period consists of the latest reports for the previous rescheduling period, updated by the set R of reports that were received since the previous rescheduling period. Hence, software must retrieve from hardware the reports in R and then update whatever data structure is used to hold the latest reports. As an optimization we assume that all the reports in R are copied to processor memory using a single scatter-gather DMA transfer. When the transfer is complete an interrupt is raised and software processes the interrupt.

To make this efficiency comparison as general as possible, we assume nothing else about the work performed by software. To make the comparison as fair as possible, we assume that the rest of the work takes zero time to execute.

Let I be the time that it takes software to begin processing an interrupt. More specifically, let I be the latency between the moment that the processor vectors the interrupt and the moment that the first instruction of user code in the corresponding interrupt service routine begins executing. Let G be the average time that it takes software to construct all the grants for a single grant period. Let R be the average time that it takes software to process all the reports in R. And let S be the average time it takes software to construct a new schedule. The CPU occupancy for items 1-3 above is thus $$C = \frac{G+I}{\pi_G} + \frac{I+R+S}{\pi_S} \quad (1)$$

To make the comparison as fair as possible, let us assume that we are using a very simple scheduling algorithm in which each subscriber device receives one grant per grant period. A more complex algorithm would require the software to perform more work, and hence would tilt this comparison further in favor of SPLIT. Given the very simple scheduling algorithm, G is O(n), where n is the current number of subscriber devices:

$$G = nG_1 + G_0 \quad (2)$$

Again to make the comparison as fair as possible, let us assume that our simple scheduling algorithm requires only O(n) time to reschedule n devices:

$$S = nS_1 + S_0 \quad (3)$$

Now consider R, the time to process all the reports in R. Because the rescheduling period is larger than the grant period, and given our assumption that each subscriber device receives one grant per grant period (in which it can send, among other things, a report), any given subscriber device will have several reports in R. Most scheduling algorithms care only about the most recent report for a given device; the information in that report must be incorporated into the scheduler's data structures, and all other reports for that device can be ignored. Hence, R can be decomposed as follows, $$R = nR_2 + NR_1 + R_0 \quad (4)$$

where N is the number of out-of-date reports in R, and $R_1$ and $R_2$ are the amounts of time needed to process an out-of-date and non-out-of-date report, respectively. If each subscriber device sends a report every time it receives a grant, then it can be seen that N is approximately the following:

$$N \approx n\left(\frac{\pi_S}{\pi_G} - 1\right) \quad (5)$$

Plugging Equations 2 through 5 into Equation 1 and simplifying gives the following:

$$C \approx \frac{n(G_1+1) + G_0 + I}{\pi_G} + \frac{n(R_2 - R_1 + S_1) + R_0 + S_0 + I}{\pi_S} \quad (6)$$

We measured the values of the constants $G_0$, $G_1$, $R_0$, $R_1$, $R_2$, $S_0$ and $S_1$ on the same platform that we used to implement the EPON mapping of SPLIT, the Xilinx Virtex II Pro VP70 programmable-logic device, described in Virtex-II Pro Platform FPGA Handbook, Xilinx, Inc., 2004. This device contains an embedded PPC processor running at 300 MHz. The results are shown in Table 1 below.

TABLE 1

| Constant | Value (ns) |
|---|---|
| $G_0$ | 880 |
| $G_1$ | 14,429 |
| I | 11,500 |
| $R_0$ | 736 |
| $R_1$ | 479 |
| $R_2$ | 14,469 |
| $S_0$ | 15,562 |
| $S_1$ | 24,560 |

The interrupt requests were generated by a circuit implemented inside the device's FPGA matrix, and the code on which we measured the constants was the same code that we used to implement SPLIT. The values of $S_0$ and $S_1$ were measured using our simple, optimized weighted round-robin scheduler.

Plugging these values into Equation 6 gives the following, $$C_{VP70} \approx \frac{14n+12}{\pi_G} + \frac{39n+28}{\pi_S} \quad (7)$$

where $\pi_G$ and $\pi_S$ are in units of microseconds. Recall that in our SPLIT implementation of EPON we set $\pi_G$ and $\pi_S$ to 1 ms and 10 ms, respectively. If we used the same values for our hypothetical software-only implementation, the resulting occupancy would be over 100% for greater than 53 subscriber devices. Even for only 32 devices the occupancy is over 60%. And recall that this analysis does not account for any of the additional work that the software in a commercial head-end device must perform (e.g., running various protocols for system management and control, performance monitoring, etc.)

Figure 7:
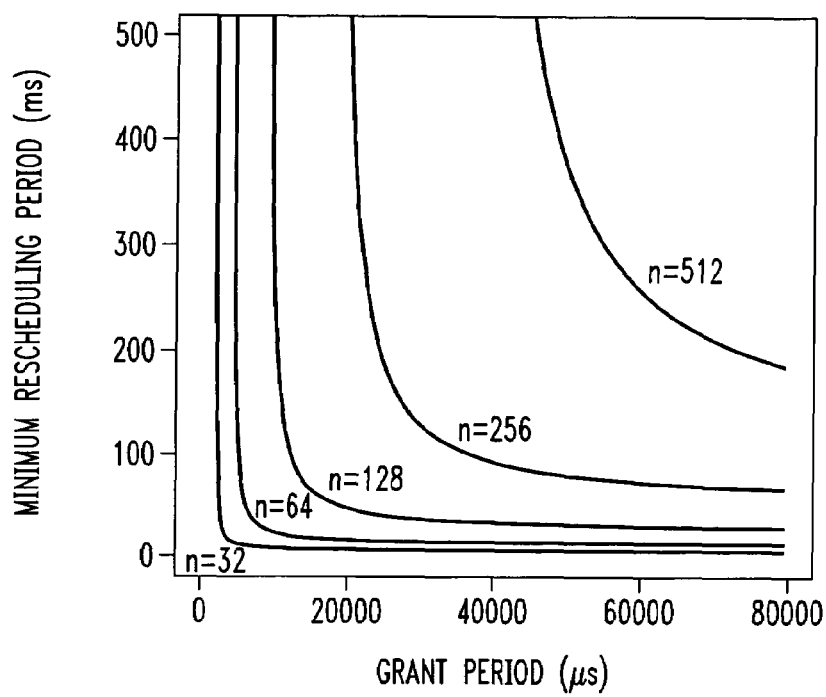
FIGS. 7 and 8 are plots showing the relationship between rescheduling period and grant period in respective software-only and SPLIT-based implementations.

In a real system, the occupancy budget for performing the work described in items 1 through 3 would depend on what else the system is doing and hence varies among implementations. There is no universal number, but it is not unreasonable to assume that it is desirable for this occupancy to be under 20%. Solving Equation 7 for $\pi_S$ and assuming 20% maximum occupancy gives the following relationship between $\pi_S$ and $\pi_G$ on the VP70:

$$\pi_S \geq \frac{\pi_G(193n+139)}{\pi_G - 72n - 62} \text{ and } \pi_G > 72n + 62 \quad (8)$$

where $\pi_G$ and $\pi_S$ are, as before, in units of microseconds. A graph of this relationship for several values of n is shown in FIG. 7. Notice the tradeoff between $\pi_G$ and $\pi_S$. For a given number of subscriber devices, if we try to minimize network latency by choosing a low value for $\pi_G$, then the rescheduling period must be high, that is, the scheduler cannot be agile. Further, as we add more subscriber devices, the minimum latency that can be achieved gets worse. For example, recall from Section V that the recommended value for $\pi_G$ for EPON is 1 ms. A simple calculation shows that this grant period is achievable only for fewer than 13 subscriber devices. Thus we see that the software-only implementation does not scale.

We now contrast these results with a SPLIT-based SMAP implementation. With SPLIT, software is not involved in constructing or transmitting grants, nor does software have to read the reports into processor memory. Out of all the work mentioned in items 1-3 at the beginning of this section, the only work that a SPLIT-based SMAP implementation must perform is rescheduling.

Because the SPLIT schedule is kept in hardware, constructing a new schedule in a SPLIT-based implementation does not necessarily take the same amount of time as in a software-only implementation. However, with properly designed hardware, accessing an entry in the hardware schedule is as fast as accessing a variable mapped in a noncacheable region of the address space (i.e., it is determined by the memory bus speed). Hence, it is reasonable to assume that S is the same in both cases. As in the software-only case, we do not factor in the work that is not related to scheduling, but would be necessary to perform in a commercial system.

Figure 8:
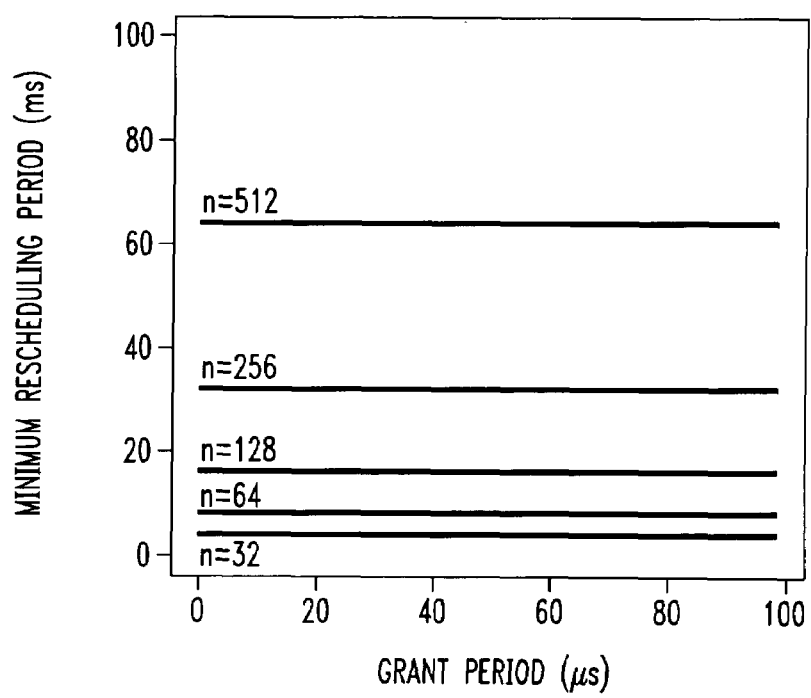

Hence, the total CPU occupancy for the SPLIT-based SMAP implementation is simply $S/\pi_S=(S_1 n+S_0)/\pi_S$. Notice that we can make the grant period as low as we like without affecting occupancy (which should not be surprising, given that we moved all grant processing to hardware). On the VP70 the occupancy is approximately $25n+16/\pi_S$, with $\pi_S$ in units of microseconds. If we again assume 20% maximum occupancy then $\pi_S$ must be at least $125n+80$, regardless of the value chosen for $\pi_G$. A graph of this relationship is shown in FIG. 8. When n is, for example, 64, $\pi_S$ must be at least 8 ms. A scheduler whose rescheduling period is 8 ms is considered agile. A simple calculation shows that an 8 ms rescheduling period in the software-only implementation is not achievable for any value of $\pi_G$ when n=64.

Thus, it is apparent that the SPLIT design described above is a flexible, efficient software-hardware partition for SMAPs. Using the SPLIT architecture, we have implemented, that is, successfully mapped, the EPON head-end (OLT) and subscriber (ONU) devices using FPGAs in the Xilinx Virtex II Pro FPGA device family. We implemented two OLT ports (with one embedded PowerPC processor serving two instances of the SPLIT architecture) in a single XC2VP70 device, and a single ONU in a smaller XC2VP30 device. Of course, numerous alternative implementations may be used.

It should also be noted that SPLIT can be mapped to other protocols, and can be used to implement more sophisticated schedulers.

The SPLIT architecture of the illustrative embodiment is general enough to apply to a wide class of SMAPs, but specific enough to be mappable in a straightforward manner to any SMAP in the class. The fact that the particular SPLIT architecture of the illustrative embodiment may not be able to handle certain SMAPs is not a deficiency of the partition, but instead a deficiency of those particular protocols. Such protocols cannot be efficiently mapped to SPLIT because of their inability to decouple the schedule computation from the message generation and processing. An attempt to define an alternative partition for such protocols typically results in either overly complex and expensive hardware or a software system with little or no hardware acceleration.

As indicated previously herein, alternative embodiments of the invention may provide partitioning for DOCSIS or other SMAPs that may be difficult to partition using the particular SPLIT architecture of the illustrative embodiment.

The above-described embodiments of the invention are intended to be illustrative only. For example, although described in conjunction with software-hardware partitioning in an EPON, the invention is applicable to other types of communication systems and other SMAPs. The system components described herein can be implemented using a wide variety of otherwise conventional arrangements of hardware and software. As noted above, the software portions of a given SMAP may be implemented at least in part in the form of one or more software programs which are configured to run on one or more processing devices comprising or otherwise associated with a head-end device, subscriber device, or other system processing device. Also, the particular software-hardware partitions of the illustrative embodiments may be varied. These and numerous other alternative embodiments within the scope of the following claims will be readily apparent to those skilled in the art.

What is claimed is:

1. A processing device for implementing at least a portion of a scheduled medium-access protocol in a communication system, the processing device comprising:
   a processor;
   a memory coupled to the processor; and
   one or more additional hardware modules;
   wherein functionality of the portion of the scheduled medium-access protocol implemented in the processing device is partitioned between software stored in the memory and executable by the processor and hardware comprising the one or more additional hardware modules;
   the functionality comprising at least a scheduler and a grant generator;
   wherein the scheduler is implemented in the software and the grant generator is implemented in the hardware;
   wherein the scheduler generates updated schedules at a rate which is independent of a rate at which the grant generator generates upstream channel access grants for subscriber devices of the system.

2. The processing device of claim 1 wherein the processing device comprises a head-end device coupled between an access network of the communication system and an external network of the communication system.

3. The processing device of claim 2 wherein the access network is coupled via subscriber devices of the system to respective subscriber networks of the system.

4. The processing device of claim 2 wherein the scheduler determines a schedule for permitting subscriber devices of the system to access an upstream channel of the system from the access network to the external network via the head-end device.

5. The processing device of claim 2 wherein the functionality further comprises a discovery module operative to allow the head-end device to discover when subscriber devices of the system join or leave the access network.

6. The processing device of claim 2 wherein the one or more additional hardware modules further comprise external network transmit and receive modules, and access network transmit and receive modules.

7. The processing device of claim 1 wherein the functionality further comprises a report processor operative to determine current bandwidth needs for subscriber devices of the system, the report processor being implemented in the hardware.

8. The processing device of claim 1 wherein the communication system comprises a passive optical network and the scheduled medium-access protocol comprises a passive optical network protocol.

9. The processing device of claim 1 wherein the one or more additional hardware modules comprise at least one of a network processor, a programmable logic device, and an application-specific integrated circuit.

10. The processing device of claim 1 wherein the memory stores at least one report table data structure, the report table data structure defining a current state of subscriber devices known to the system.

11. The processing device of claim 1 wherein the memory stores at least one schedule data structure, the schedule data structure defining a schedule computed in the software by the scheduler.

12. The processing device of claim 11 wherein a given entry in the schedule data structure comprises at least one of the following: (i) start time and length of up to a designated number of grants, (ii) a flags bitmask, and (iii) a pointer to a next entry in the schedule.

13. The processing device of claim 1 wherein the grant generator issues a set of grants each grant period in accordance with a basic schedule comprising a linked list of grants which enforces grant period and minimum guaranteed bandwidth constraints for subscriber devices of the system.

14. The processing device of claim 1 wherein the processing device is implemented as at least one integrated circuit.

15. A processing device for implementing at least a portion of a scheduled medium-access protocol in a communication system, the processing device comprising:
a processor;
a memory coupled to the processor; and
one or more additional hardware modules;
wherein functionality of the portion of the scheduled medium-access protocol implemented in the processing device is partitioned between software stored in the memory and executable by the processor and hardware comprising the one or more additional hardware modules;
the functionality comprising at least a scheduler and a grant generator;
wherein the scheduler is implemented in the software and the grant generator is implemented in the hardware; and
wherein a plurality of schedule data structures are stored in the memory, at least one of the schedule data structures defining a schedule computed in the software by the scheduler, the grant generator utilizing a first one of the schedule data structures to generate upstream channel access grants for subscriber devices of the system, the scheduler using a second one of the schedule data structures to update the schedule.

16. The processing device of claim 15 wherein the scheduler, after updating the schedule using the second schedule data structure, is operative to direct the grant generator to switch from utilization of the first schedule data structure to utilization of the second schedule data structure in generating the upstream channel access grants.

17. A processing device for implementing at least a portion of a scheduled medium-access protocol in a communication system, the processing device comprising:
a processor;
a memory coupled to the processor; and
one or more additional hardware modules;
wherein functionality of the portion of the scheduled medium-access protocol implemented in the processing device is partitioned between software stored in the memory and executable by the processor and hardware comprising the one or more additional hardware modules;
the functionality comprising at least a scheduler and a grant generator;
wherein the scheduler is implemented in the software and the grant generator is implemented in the hardware; and
wherein the grant generator issues grants in accordance with an enhanced schedule comprising an ordered list of basic schedules, each of which defines grants for a corresponding set of time units in an upstream channel of the system.

18. The processing device of claim 17 wherein every $\pi_G$ time units the grant generator issues the grants for a given basic schedule $S_i$ and then advances a pointer to a next basic schedule in the ordered list.

19. A processing device for implementing at least a portion of a scheduled medium-access protocol in a communication system, the processing device comprising:
a processor;
a memory coupled to the processor; and
one or more additional hardware modules;
wherein functionality of the portion of the scheduled medium-access protocol implemented in the processing device is partitioned between software stored in the memory and executable by the processor and hardware comprising the one or more additional hardware modules;
the functionality comprising at least a scheduler, a discovery element and a grant processor;
wherein the discovery element is implemented in the software and the grant processor is implemented in the hardware;
wherein the scheduler generates updated schedules at a rate which is independent of a rate at which the grant generator generates upstream channel access grants for subscriber devices of the system.

20. A method of implementing at least a portion of a scheduled medium-access protocol in a processing device of a communication system, the processing device comprising a processor, a memory coupled to the processor, and one or more additional hardware modules, the method comprising:
partitioning functionality of the portion of the scheduled medium-access protocol implemented in the processing device between software stored in the memory and executable by the processor and hardware comprising the one or more additional hardware modules;
the functionality comprising at least a scheduler and a grant generator;
wherein the scheduler is implemented in the software and the grant generator is implemented in the hardware;
wherein the scheduler generates updated schedules at a rate which is independent of a rate at which the grant generator generates upstream channel access grants for subscriber devices of the system.

21. The method of claim 20 wherein the functionality further comprises a report processor operative to determine current bandwidth needs for subscriber devices of the system, the report processor being implemented in the hardware.

22. The method of claim 20 wherein a plurality of schedule data structures are stored in the memory, at least one of the schedule data structures defining a given schedule computed in the software by the scheduler, the grant generator utilizing a first one of the schedule data structures to generate upstream channel access grants for subscriber devices of the system, the scheduler using a second one of the schedule data structures to update the given schedule.

* * * * *